Oct. 23, 1962   J. C. ROGERS   3,059,632
STOVE CONSTRUCTION
Filed May 24, 1960   2 Sheets-Sheet 1

INVENTOR.
John C. Rogers
BY Soans, Anderson,
Luedeka & Fitch
Attys.

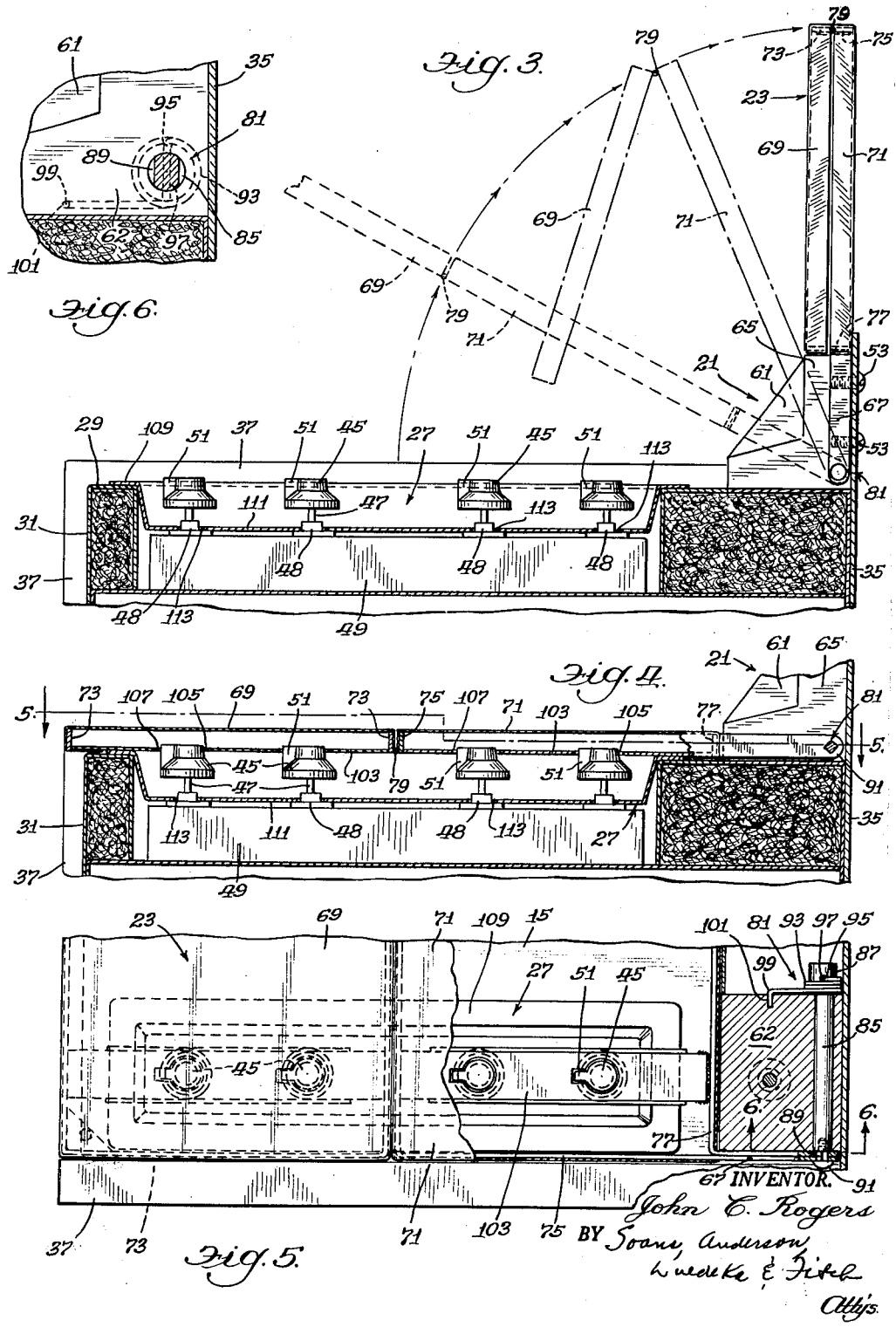

United States Patent Office 3,059,632
Patented Oct. 23, 1962

3,059,632
STOVE CONSTRUCTION
John C. Rogers, River Forest, Ill., assignor to Crown Stove Works, Chicago, Ill., a corporation of Illinois
Filed May 24, 1960, Ser. No. 31,427
2 Claims. (Cl. 126—37)

This invention relates generally to kitchen stoves or ranges. More particularly, the invention relates to a stove having a novel hinged cover construction which is arranged to permit full view of a rearwardly located back guard or instrument panel when the cover is in either its generally upright open position or in its closed position overlying the cooking top of the stove.

The invention also relates to a stove having both the burners and the associated controls located in the cooking top and having a cover which, for safety purposes, is fully closable to provide a generally smooth counter top only if all of the controls are in the closed or "off" position. Still further, the invention relates to a stove construction including a pan which underlies the burner controls and which is removable to facilitate cleaning of a heretofore generally inaccessible and dirt-collecting area.

The principal object of the invention is the provision of a new and improved stove construction. A further object of the invention is the provision of a stove incorporating one or more of the features referred to above. A still further object of the invention is the provision of a stove which is of square styling for harmonizing association with other kitchen units, such as a cabinet sink or the like, to provide a so-called "custom built" appearance featuring a generally smooth and continuous counter top. Other objects and advantages of the invention will become apparent from the following description and the accompanying drawings of a specific embodiment of the invention in which:

FIGURE 3 is a fragmentary vertical sectional view showing the two cover sections folded in open position, the view being taken through the burner control part of the stove;

FIGURE 4 is a view similar to FIGURE 3 showing the cover in its closed position;

FIGURE 5 is a fragmentary sectional view taken along line 5—5 of FIGURE 4; and

FIGURE 6 is an enlarged fragmentary sectional view taken along line 6—6 of FIGURE 5.

Figure 1:
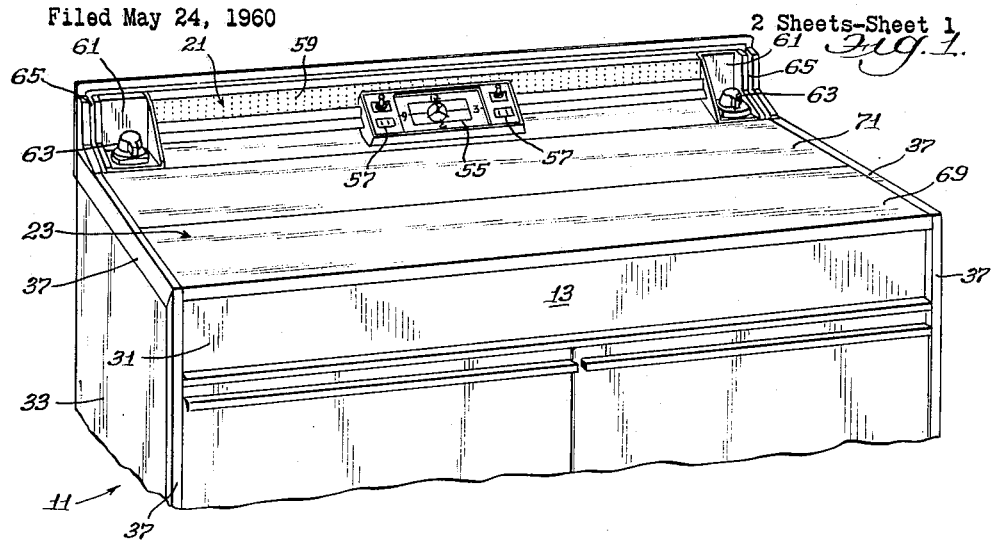
FIGURE 1 is a perspective view of the upper part of a stove which embodies the features of the invention, and which is shown with the cover in its closed position.
Figure 2:
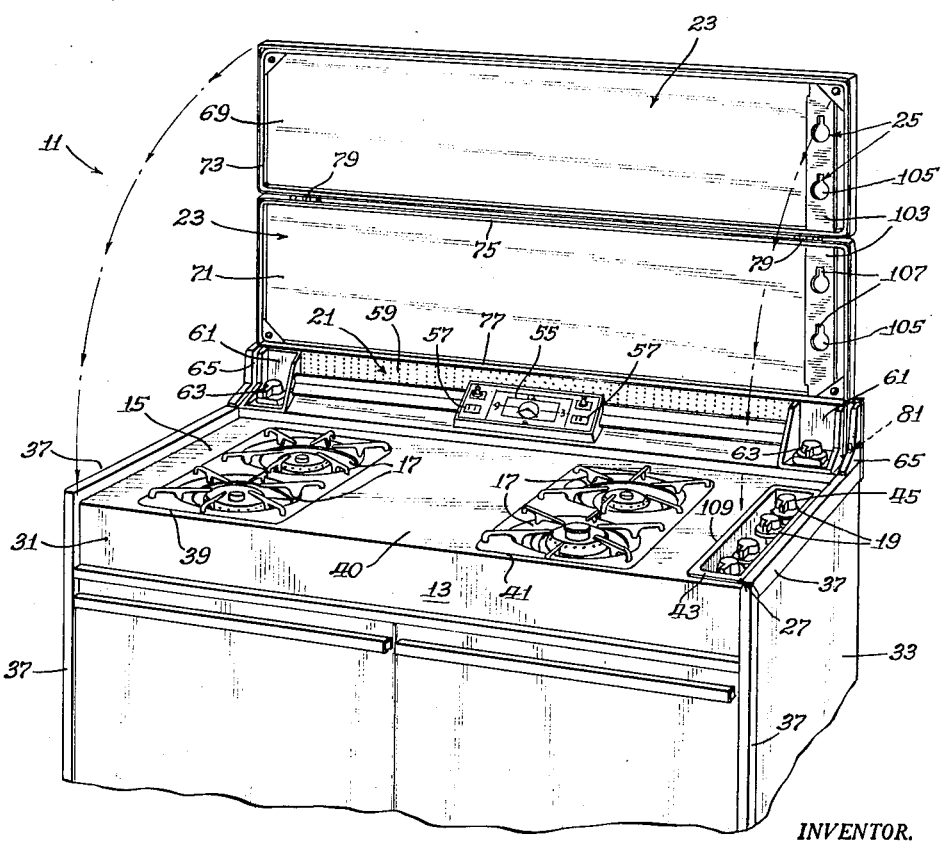
FIGURE 2 is a perspective view of the upper portion of the stove shown in FIGURE 1 and illustrates the two hinged sections of the cover disposed vertically in extended open position.

Shown in the drawings is a stove 11 comprising a generally rectangular main body 13 having a cooking top 15 (see FIGURE 2) incorporating a series of burners 17 and associated burner controls 19, a back guard or instrument panel 21 extending upwardly from the main body 13 from along the rear edge of the cooking top 15, and a cover 23 which is hinged to the main body 13 for movement between the closed position covering the cooking top 15, as shown in FIGURE 1, and an open position, as shown in FIGURE 3, in which the cover is folded upon itself and extends in generally upright disposition from immediately above the upper edge of the instrument panel 21. Thus, the instrument panel 21 may be readily viewed regardless of whether the cover 23 is located in its closed position or in its open position.

Other features of the disclosed construction include the incorporation in the cover, for safety purposes, of means 25 (see FIGURE 2) cooperating with the burner controls 19 for preventing complete closure of the cover 23 except when each of the burner controls is closed; and the incorporation of a removable pan 27 under the burner controls to facilitate cleaning of the stove.

Considering the construction of the various components in greater detail, the illustrated main body 13 is fabricated and conventionally insulated to provide a square-appearing free standing stove which can be placed side-by-side with modern kitchen cabinets and sinks to provide a custom built appearance. The construction of the main body includes generally a top panel 29 (see FIGURE 3) incorporating the horizontal cooking top 15, a vertical panel 31 at the upper front, side panels 33 and a back panel 35. The main body 13 is trimmed along its top and front side edges with thin chrome bars 37 which emphasize its square styling.

The illustrated cooking top 15 includes several openings 39, 41, and 43. The openings 39 and 41 contain the burners 17 which may be either gas or electric and which are spaced apart in pairs to provide a central working area 40. However, it is apparent that the number and arrangement of burners can be varied if desired.

In the disclosed construction, the controls 19 for the burners extend through the opening 43 in the cooking top and are located in an aligned row adjacent one side of the cooking top 15. However, the location of the controls in the cooking top may be varied. Each control 19 includes a knob 45 which is removably secured on the upper end of a stem 47 extending upwardly from a gas valve or electric switch 48 on a housing or manifold 49. The details of the parts 49, 48, 47, and 45 are of no particular importance to the present invention as these units are all conventional, except for the fabrication of each knob 45 with means for cooperation with the cover 23, as will be more fully explained, to prevent its complete closure when any one of the controls 19 is open. In the disclosed construction, this means comprises a radially projecting lug 51 on the upper part of each knob 45.

The instrument panel or back guard 21 is suitably secured to the back panel 35 by screws 53, as shown in FIGURE 3, and includes, in the illustrated embodiment, a centrally located electric clock 55 flanked by a pair of electrical outlets 57. The instrument panel 21 also includes a translucent or perforated panel 59 which can be illuminated by a lamp (not shown) located behind the panel. At each end of the instrument panel 21 a pocket or recess 61 is provided for controls 63, such as oven and broiler controls or a timer. Each pocket 61 has a bottom wall or deck 62. In addition, there is provided outwardly of each of the pockets 61 a rearwardly projecting slot 65 for receiving a yoke including spaced rearwardly extending hinge straps 67 projecting from the cover 23 (see FIGURE 3).

The illustrated cover 23 comprises forward and rearward rectangular inverted pans or panels 69 and 71, each of which is suitably strengthened around its periphery. The forward panel 69 is strengthened by an inner peripheral reinforcing bar 73 (see FIGURES 2 and 4), while the rearward panel 71 is strengthened around its periphery by forward and rearward U-shaped bars 75 and 77 whose free ends project rearwardly and are joined together to provide a yoke including the hinge straps 67 by which the cover 23 is mounted on the main body 13 of the stove. The cover panels 69 and 71 are connected to each other, as shown in FIGURE 3, by hinges 79 connecting the bars 73 and 75 so as to facilitate folding the cover 23 upon itself to reduce its height when in the upright position.

The cover 23 is hingedly mounted on a pair of pivot means 81, one of which is journalled rearwardly in the bottom wall 62 of each of the pockets 61. More specifically, each pivot means 81 includes a pin 85 having an enlarged head 87 at one end and a shank 89 of polygonal cross section at the other end. The shanks 89 pass through aligned openings in the rearward ends of the hinge straps 67 thereby preventing angular slippage of the strap 67 relative to the pins 85. The hinge straps 67 are retained on the shanks 89 by headed screws 91.

The cover 23 is held in its upright position by suitable spring means which, in the illustrated embodiment, comprises a torsion spring 93. This spring 93 is located in encircling relation to the enlarged head 87 of the pin 85 and includes an inner end 95 which projects through a diametric bore 97 in the enlarged head 87. The other end 99 of the spring 93 projects into a hole 101 provided in the side of the pocket bottom wall 62, thereby stabilizing the spring.

The spring 93 is proportioned and the diametric bore 97 is located relative to the polygonal configuration of the shank 89 so that the spring becomes increasingly tensioned during downward swinging of the cover 23 from its upright position. Preferably, when the cover 23 is in its upright position, the tension condition of the spring 93 is just sufficient to over balance the initial falling movement of the cover 23, so that a slight positive force is necessary to displace the cover forwardly from its upright position. Rearward rocking of the cover 23 from its upright position is prevented by engagement of the hinge straps 67 with the back panel 35, as shown in FIGURE 3.

Each of the cover panels 69 and 71 includes, on its underside, means for preventing complete closure of the cover 23 in the event that any one of the burner controls 19 is open. In the illustrated construction, each of the cover panels 69 and 71 has secured to its underside a plate member 103 (see FIGURE 2) having therein keyhole openings 105 located for receipt of the upper part of the knobs 45. Each keyhole opening 105 includes a radial slot 107 which will admit the radial lug 51 of one of the knobs 45 when the associated burner control is closed. However, if any of the burner controls 19 is not closed, the lug 51 will not be aligned with the slot 107 and receipt of the associated knob 45 within the keyhole opening 105 will be prevented to preclude complete closure of the cover 23 over the cooking top 15. Thus, this arrangement provides an extremely valuable safety feature.

As pointed out before, the burner controls 19 extend through the opening 43 in the cooking top 15. This opening 43 is normally closed by the removable pan 27 which has sufficient depth to house the lower or major portion of the knobs 45. The pan 27 also includes a peripheral flange 109 permitting support of the pan by the margin of the cooking top surrounding the opening 43. In its bottom 111, the pan 27 includes a series of apertures 113 spaced in accordance with the location of the controls 19 to receive the upper part of the valves 48.

During cleaning of the stove 11, the knobs 45 can be removed from their stems 47 and the pan 27 lifted out of the opening 43 in the cooking top 15, thereby exposing the valves or switches 48 to permit cleaning of the surrounding area under the cooking top 15.

The disclosed construction provides a modern styled stove which can be advantageously coupled with other kitchen units of modern design to provide a continuous counter top and a custom built-in appearance. The cover 23, when in its closed position, permits full view of the instrument panel 21 and is designed to be coplanar with the top surface of adjoining kitchen units of standard counter height. In addition, the cover 23 can be rearwardly raised and folded upon itself to a self-retaining splash guard position projecting upwardly from the top edge of the instrument panel for a height of one-half the depth of the cooking top 15. In both positions, the instrument panel 21 is open to full view and the various accessories and controls mounted thereon are readily accessible. Moreover, the cover 23, in cooperation with the burner controls 19, also provides a desirable safety feature by preventing full cover closure except when each of the burner controls 19 is closed.

Various of the features of the invention are set forth in the following claims.

What is claimed is:

1. A stove comprising a main body having a planar cooking top with a series of openings therein, an upwardly extending back guard along the rear edge of said top, a series of gas burners positioned within certain of said openings, a series of controls connected with said burners, each of said controls being movable relative to an "off" position to turn one of said burners "on" and including a valve stem extending through one of said openings and a knob removably mounted on said stem and including a laterally projecting lug in predetermined radial orientation thereto, and a panel removably located in said one opening and having an aperture therein for passage therethrough of said stem so as to facilitate removal of said panel from said cooking top for cleaning thereunder after removal of said knob from said stem, and a sectional cover hinged to said main body for movement between a cover position overlying said cooking top and a generally vertical, splash guard position extending from immediately above said back guard so as to expose the back guard from the front of the stove, said cover including a pair of planar half sections hinged to one another along an axis parallel to the hinging of said cover to said main body, said half sections being movable between a first generally coplanar relationship when said cover is in its cover position and a facing, generally parallel relationship when said cover is in said splash guard position, whereby the height of said cover above said back guard, when in said splash guard position, is one half the depth of said cooking top, said cover sections having on the undersurface thereof a series of receptacles capable of receiving said controls only when the latter are all moved to place said lugs in said "off" position, thereby preventing complete closure of said cover when any of said burners is "on."

2. A stove comprising a main body having a planar cooking top with a series of openings therein, an upwardly extending back guard along the rear edge of said top, a series of gas burners positioned within certain of said openings, a series of controls connected with said burners and positioned in one of said openings, each of said controls being movable between an "off" position and an "on" position, and a sectional cover hinged to said main body for movement between a cover position overlying said cooking top and a generally vertical, splash guard position with both sections extending from immediately above said back guard so as to expose the back guard from the front of the stove, said cover including a pair of half sections hinged to one another along an axis parallel to the hinging of said cover to said main body, said half sections being movable between a first generally coplanar relationship when said cover is in its cover position and a facing, generally parallel relationship when said cover is in said splash guard position, whereby the height of said cover above said back guard, when in said splash guard position, is one half the depth of said cooking top, and means defining a series of receptacles on the undersurface of said cover sections which cooperate with said controls so as to prevent closing of said cover over the burners when any of said controls are in an "on" position.

References Cited in the file of this patent

UNITED STATES PATENTS

| 1,820,849 | Teller et al. | Aug. 25, 1931 |
| 2,107,972 | Antrim et al. | Feb. 8, 1938 |
| 2,252,753 | Brodbeck | Aug. 19, 1941 |
| 2,390,234 | Applebaum | Dec. 4, 1945 |
| 2,939,453 | Kamin | June 7, 1960 |

FOREIGN PATENTS

| 516,319 | Germany | Feb. 10, 1931 |
| 560,647 | Italy | Apr. 8, 1957 |